Patented Feb. 19, 1929.

1,702,334

UNITED STATES PATENT OFFICE.

ARTHUR BINZ, OF BERLIN, AND CURT RÄTH, OF RANGSDORF, KREIS TELTOW, GERMANY.

ARSENO COMPOUNDS OF THE PYRIDINE SERIES AND PROCESS OF MAKING THEM.

No Drawing. Application filed November 8, 1924, Serial No. 748,717, and in Germany November 19, 1923.

Our invention relates to new therapeutically valuable compounds containing arsenic and to the method of making same.

According to our present invention valuable heterocyclical compounds of arsenic are obtained by causing heterocyclical diazo compounds to react with arsenic or with substances containing arsenic.

For example, amino derivatives of heterocyclical compounds capable of being diazotized, for instance amino derivatives of the pyridine series, are converted into the diazo compounds and then the other component of the reaction such as for instance an arsenious salt or even free arsenious acid are allowed to act upon the said diazo compounds.

As starting materials for the preparation of compounds in accordance with the present invention substances with heterocyclical nucleï of various kinds may be used, for example such which contain nitrogen or oxygen or sulfur or sulfur dioxide, or elements or groups of different kinds for example nitrogen and sulfur. The starting materials can be substituted, the substituting radicle being advantageously of an electronegative nature or having a therapeutical influence. Such substituents are for example groups such as the hydroxyl group, amino group, acetyl amino group, glycine group or halogen for instance chlorine etc. Starting materials containing several substituents can be used for carrying out our invention. Instead of starting from substituted compounds the present invention can also be carried into effect in certain cases by first introducing the arsonic acid radicle or other radicles of the kind by the agency of the diazo process and afterwards the desired substituents.

The introduction of arsenic can be achieved in neutral, acid or alkaline solution at ordinary or elevated temperature. It is advisable to previously ascertain by experiment the method best suited for the process. The reaction can be carried out by employing equimolecular quantities of the reacting compounds. Generally, however, it is more favourable to use an excess, which in certain cases may even be fairly large, of the arsenic compound, for example one molecule of the heterocyclical starting material to 2–3 molecules and even more of alkali metal arsenite. In some cases the reaction is advantageously influenced by adding catalysts for example copper powder.

By converting arsonic acids, or the like into arseno compounds, it is possible to easily purify the former substances. Thus, the heterocyclical arsonic acids, prepared according to our invention through the agency of the diazo process or by any other method, are converted into the corresponding arseno compounds, by treating them with reducing agents, whereafter the latter are re-converted into the corresponding acids by the treatment with suitable oxidizing agents for instance hydrogen peroxide.

Example 1.

One molecular weight of $\alpha$-hydroxy-$\beta'$-amino pyridine is diazotized in hydrochloric acid-solution in the usual way by adding sodium nitrite. The diazo solution thus obtained is added drop by drop to a solution of sodium arsenite. The liquid, made slightly alkaline, is then allowed to stand for some time to complete the reaction. The $\alpha$-hydroxy-$\beta'$-pyridine arsonic acid is obtained from the solution in the way customary for the preparation of aromatic arsonic acids. The arsonic acid crystallizing in colourless needles, decomposes at about 215° C. with foaming and charring; it is sparingly soluble in alcohol, but readily dissolved in water. The salts are prepared by dissolving the arsinic acid in the calculated quantity of caustic alkali solution which solution then is concentrated.

Example 2.

A diazo solution prepared from $\beta'$-chloro-p-amino-pyridine in the well known fashion is mixed gradually with a solution of cuprous cyanide. The reaction starts at once with much foaming. By making strongly alkaline and distilling with a current of steam the nitrile of the $\beta'$-chloro-nicotinic acid is obtained in white crystals, which are sparingly soluble in water and melt at 60° C.

The invention offers the possibility of preparing compounds with very valuable properties. With the aid of this invention for example arsonic acids are obtained which are distinguished by their great curvature powers in combination with an extraordinary non-toxicity and stability and which are superior in various ways to the hitherto known aromatic arsonic acids.

Various changes may be made in the details disclosed in the foregoing specification without departing from the invention or sacrificing the advantages thereof.

What we claim is:

1. A heterocyclical compound of the pyridine series containing arsenic.

2. A heterocyclical compound of the pyridine series containing arsenic, and free from carbonyl groups in non-cyclical linkage.

3. Process of manufacturing heterocyclical compounds which comprises introducing an arsenic compound into a heterocyclical starting compound which is capable of being diazotized.

4. Process of manufacturing heterocyclical compounds which comprises causing a substance containing arsenic to react with a heterocyclical diazo compound.

5. Process of manufacturing heterocyclical compounds which comprises causing a diazotized heterocyclical compound free from active carbonyl groups to react with an arsenite.

6. Process of manufacturing heterocyclical compounds which comprises introducing, through the agency of the diazo-process an arsenic into a heterocyclical compound and converting the substance of the arsonic acid type thus obtained into a salt.

7. Process of manufacturing heterocyclical compounds which comprises causing a diazotized heterocyclical compound to react with an arsenite and converting the arsonic acid thus obtained into a salt.

8. Process of manufacturing therapeutically valuable heterocyclical compounds of the pyridine series which comprises introducing arsenic into a heterocyclical compound of the pyridine series which is capable of being diazotized.

9. Process of manufacturing therapeutically valuable pyridine compounds which consists in causing a substance containing arsenic to react with a pyridine diazo compound.

10. As a new composition of matter, the $\alpha$-oxy-$\beta'$-pyridine arsonic acid, crystallizing in colorless needles, decomposing at about 215° C. under foaming and charring, being sparingly soluble in alcohol and readily soluble in water.

11. Process of purifying heterocyclical compounds which comprises transforming a heterocyclical substance of the arsonic acid type into a substance of a lower degree of oxidation by treating same with a reducing agent and reconverting the product of reduction into the starting product by means of an oxidizing agent.

12. Process of purifying heterocyclical compounds which comprises treating a diazotized heterocyclical compound with a substance containing arsenic, reducing the compound of the arsonic acid type obtained, reconverting the reduction product into the arsonic acid by oxidation and converting such acid into its salt.

Signed at Berlin in the county of Brandenburg and State of Prussia this 20th day of October, A. D. 1924.

ARTHUR BINZ.
CURT RÄTH.